(12) United States Patent
Schechter et al.

(10) Patent No.: US 11,084,001 B2
(45) Date of Patent: Aug. 10, 2021

(54) SELECTIVELY-PERMEABLE MEMBRANE

(71) Applicant: ARIEL SCIENTIFIC INNOVATIONS LTD., Ariel (IL)

(72) Inventors: Alex Schechter, Givat Koach (IL); Edward Bormashenko, Ariel (IL); Olga Krichevski, Ariel (IL)

(73) Assignee: Ariel Scientific Innovations Ltd., Ariel (IL)

( * ) Notice: Subject to any disclaimer, the term of this patent is extended or adjusted under 35 U.S.C. 154(b) by 337 days.

(21) Appl. No.: 16/330,095

(22) PCT Filed: Sep. 3, 2017

(86) PCT No.: PCT/IB2017/055290
§ 371 (c)(1),
(2) Date: Mar. 3, 2019

(87) PCT Pub. No.: WO2018/042392
PCT Pub. Date: Mar. 8, 2018

(65) Prior Publication Data
US 2019/0232233 A1    Aug. 1, 2019

Related U.S. Application Data

(60) Provisional application No. 62/383,435, filed on Sep. 4, 2016.

(51) Int. Cl.
*B01D 53/22* (2006.01)
*B01D 69/14* (2006.01)
(Continued)

(52) U.S. Cl.
CPC ......... *B01D 69/147* (2013.01); *B01D 53/228* (2013.01); *B01D 69/02* (2013.01);
(Continued)

(58) Field of Classification Search
CPC .... B01D 69/10; B01D 2325/12; B01D 69/02; B01D 69/147; B01D 53/228;
(Continued)

(56) References Cited

U.S. PATENT DOCUMENTS 3,396,510 A * 8/1968 Ward, III ............... B01D 61/38
95/44
3,445,321 A    5/1969 Groves
(Continued)

FOREIGN PATENT DOCUMENTS

| | | |
|---|---|---|
| EP | 0081182 A2 | 6/1983 |
| JP | S63126524 A | 5/1988 |
| WO | 2010086630 | 8/2010 |

OTHER PUBLICATIONS

Nishide et al., 'Effect of Polymer Matrix on the Oxygen Diffusion via a Cobalt Porphyrin Fixed in a Membrane', Macromolecules, 24, pp. 6306-6309, 1991.
(Continued)

*Primary Examiner* — Anthony R Shumate
(74) *Attorney, Agent, or Firm* — The Law Office of Joseph L. Felber (57) ABSTRACT

Disclosed are selectively-permeable membranes and components configured for selective permeation of a specified gas, such as oxygen, therethrough, methods for making the same and methods for using the same, for example, to implement fuel cells and electrochemical cells.

20 Claims, 3 Drawing Sheets

(51) Int. Cl.
  *B01D 69/10*   (2006.01)
  *B01D 71/50*   (2006.01)
  *B01D 69/02*   (2006.01)
  *H01M 8/0239*  (2016.01)
  *H01M 8/0243*  (2016.01)

(52) U.S. Cl.
  CPC ............ *B01D 69/10* (2013.01); *B01D 71/50* (2013.01); *B01D 2325/06* (2013.01); *B01D 2325/08* (2013.01); *B01D 2325/12* (2013.01); *H01M 8/0239* (2013.01); *H01M 8/0243* (2013.01)

(58) Field of Classification Search
  CPC ........... B01D 2325/06; B01D 2325/08; B01D 71/50; H01M 8/0243; H01M 8/0239
  See application file for complete search history.

(56) References Cited

U.S. PATENT DOCUMENTS

| | | | |
|---|---|---|---|
| 6,627,291 B1 * | 9/2003 | Clark | B01D 61/18 210/500.1 |
| 6,764,745 B1 * | 7/2004 | Karasawa | B32B 3/30 428/141 |
| 6,780,497 B1 * | 8/2004 | Walter | A61F 2/0077 204/157.15 |
| 7,868,957 B2 * | 1/2011 | Yamazaki | H01L 21/28008 349/43 |
| 8,282,713 B2 * | 10/2012 | Smithies | B01D 63/14 96/11 |
| 8,382,874 B2 * | 2/2013 | Greist | B01D 46/42 55/496 |
| 8,425,656 B2 * | 4/2013 | Ciora, Jr. | F23J 15/06 95/45 |
| 8,858,681 B2 * | 10/2014 | Harp | B01D 39/1623 95/45 |
| 8,911,540 B2 * | 12/2014 | Baer | B29C 48/90 96/12 |
| 8,979,978 B2 * | 3/2015 | Miller | B01D 71/021 95/47 |
| 2004/0112636 A1 * | 6/2004 | Kawai | H05K 3/061 174/263 |
| 2005/0124242 A1 * | 6/2005 | Norvell | B32B 27/12 442/76 |
| 2006/0047311 A1 * | 3/2006 | Lutz | A01K 91/00 606/228 |
| 2006/0165935 A1 * | 7/2006 | Studer | B41J 2/17513 428/40.1 |
| 2006/0201348 A1 * | 9/2006 | Lee | B65C 9/40 101/11 |
| 2007/0231542 A1 * | 10/2007 | Deng | B08B 17/065 428/141 |
| 2009/0147196 A1 * | 6/2009 | Horie | C08J 7/043 349/122 |
| 2010/0158561 A1 * | 6/2010 | Mitsumori | G03G 15/75 399/111 |
| 2013/0287678 A1 * | 10/2013 | Okada | B01D 53/268 423/652 |
| 2014/0162148 A1 | 6/2014 | Omoda et al. | |
| 2014/0352540 A1 * | 12/2014 | Okada | C01B 3/503 96/12 |
| 2018/0035553 A1 * | 2/2018 | Liu | H01L 21/77 |
| 2018/0106474 A1 * | 4/2018 | Fortenbacher | F22G 1/165 |
| 2020/0168477 A1 * | 5/2020 | Kwon | H01L 21/568 |
| 2020/0323043 A1 * | 10/2020 | Fortenbacher | H05B 1/023 |

OTHER PUBLICATIONS

Shentu et al., 'High Oxygen Permeation and Persistent Oxygen-Carrying in a Poly(vinylimidazole-co-fluoroalkyl methacrylate)-Cobaltporphyrin Membrane', Polymer Journal, vol. 33 (10), pp. 807-811, 2001.
Yoshio Okahata et al., 'Highly Selective Transport of Molecular Oxygen in a Polymer Containing a Cobalt Porphyrin Complex as a Fixed Carrier', Macromolecules, 19, pp. 494-496, 1986.
Chen et al., 'Effect of Nonsolvent/Oxygen Carrier Additives on Gas Separation Performance of Polycarbonate Membranes', Separation Science and Technology, 32(5), pp. 925-937, 1997.
Mathias Ulbricht, 'Advanced functional polymer membranes', Polymer 47, pp. 2217-2262, 2006.
Crowther et al., "Oxygen Selective Membranes for Li-Air (O2) Batteries," Membranes 2012, 2, 216-227; doi:10.3390/membranes2020216, May 11, 2012.
Sahapatsombut et al., "Modelling of operation of a lithium-air battery with ambient air and oxygen-selective membrane," Journal of Power Sources 249 (2014) 418e430, Nov. 5, 2013.
International Search Report and Written Opinion for PCT/IB2017/055290, dated Nov. 28, 2017.
"Research Progress of Gas Separation Membrane", Zhou Qi et al., pp. 18-25, issue 1, 2001, Chemistry (Huaxue Tongbao), publication date Dec. 31, 2001 (Dec. 31, 2001), machine translation uploaded herewith.
Introduction to Bioinorganic Chemistry, Ji Liangnian et al., pp. 106-108, Sun Yat-sen University Press, Sep. 1992, 1st Edition, 1st Print, publication date Sep. 30, 1992 (Sep. 30, 1992), machine translation uploaded herewith.
Energy-Saving Technology of Industrial Kilns in Developed Countries, Edited by Xie Zhonghua, p. 121, East China University of Science and Technology Press, Jul. 1995, 1st Edition, 1st Print, publication date Jul. 31, 1995 (Jul. 31, 1995), machine translation uploaded herewith.

* cited by examiner

SELECTIVELY-PERMEABLE MEMBRANE

RELATED APPLICATION

The present application gains priority from U.S. Provisional Patent Application 62/383,435 filed 4 Sep. 2016, which is included by reference as if fully set-forth herein.

FIELD AND BACKGROUND OF THE INVENTION

The invention, in some embodiments, relates to the field of gas-diffusion membranes and more particularly, but not exclusively, to selectively-permeable membranes that, in some embodiments, are useful for preferential passage of specified gas molecules from one fluid to another, for example oxygen molecules. Some embodiments of such selectively-permeable membranes are useful in the field of fuel cells and metal-air electrochemical cells.

Metal-air electrochemical cells (e.g., zinc-air electrochemical cells) produce current by oxidizing elemental metal while reducing molecular oxygen, typically from ambient air.

Figure 1:
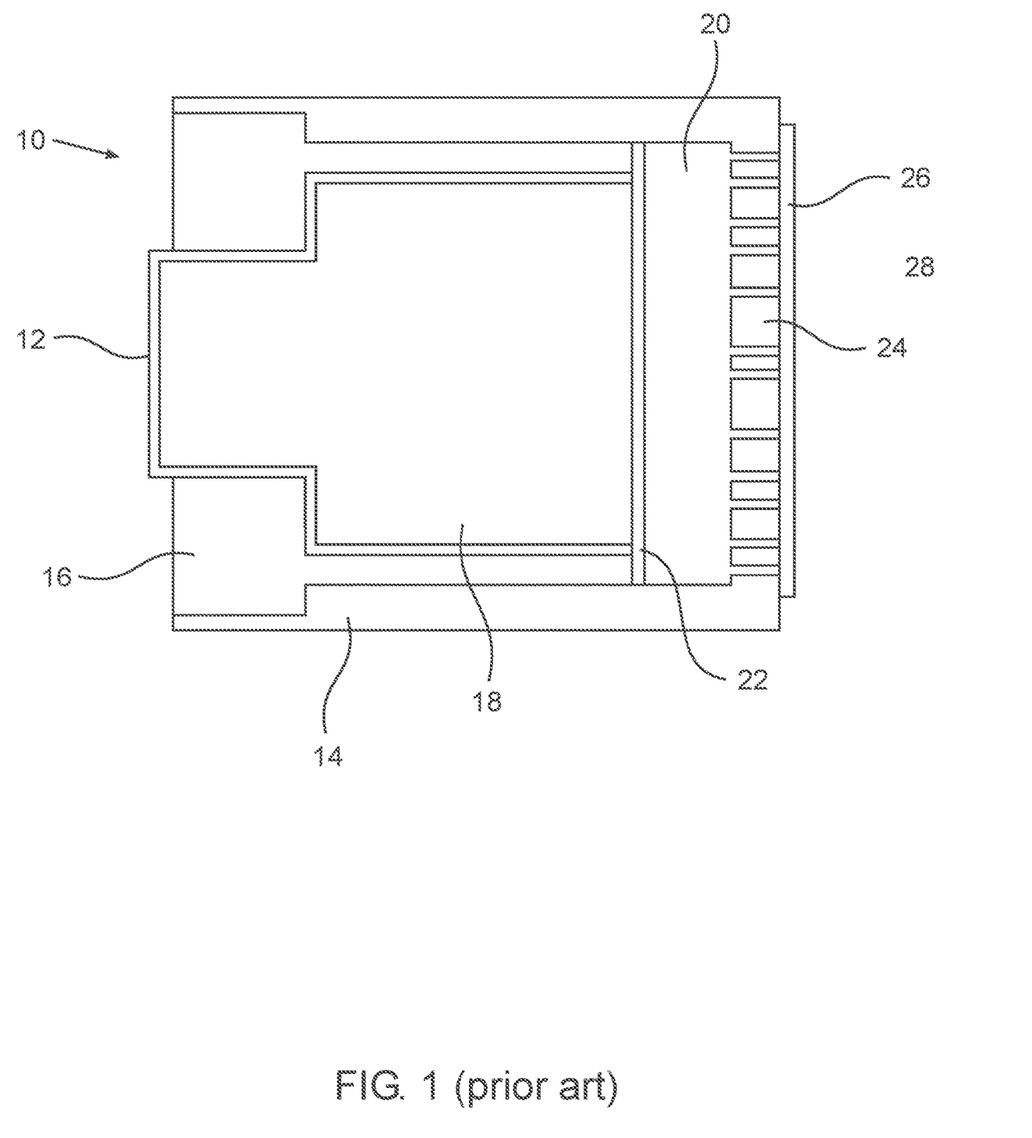
FIG. 1 (prior art) is a schematic depiction of a metal-air electrochemical cell in side cross-section.

A typical metal-air electrochemical cell 10 is schematically depicted in FIG. 1 in side cross section and comprises an inner container 12 as a negative terminal and an outer container 14 as a positive terminal, inner container 12 and outer container 14 mutually electrically isolated by an insulator ring 16. An anode slurry 18 comprising particles of an elemental metal (e.g., zinc) suspended in a basic aqueous electrolyte solution is contained in a volume defined by inner container 12 and is in electrical contact with inner container 12. Anode slurry 18 is separated from an air cathode 20 by an electrically-insulating separator 22 (e.g., a polymer mesh, asbestos felt or similar component) having pores configured to prevent passage of metal particles from slurry 18 to air cathode 20 but allowing passage of water molecules and hydroxyl ions. Air cathode 20 is a volume defined by outer container 14 that is filled with an oxygen-reduction catalyst on an electrically-conductive support such as graphite in electrical contact with outer container 14 soaked with a basic aqueous electrolyte solution. Gas molecules from ambient air 28 are able to move in and out of air cathode 20 through perforations in a perforated cover 24. Cell 10 is depicted with an optional gas-diffusion membrane 26.

When a metal-air electrochemical cell such as 10 is operating, elemental metal reacts with hydroxyl ions in anode slurry 18 to release electrons to inner container 12 (that constitutes the negative terminal of cell 10) yielding a metal hydroxide. The released electrons flow as an electrical current to inner container 12, through a load (not-depicted in FIG. 1), through outer container 14 and then to the catalyst support in air cathode 20. Molecular oxygen dissolved in the electrolyte solution of air cathode 20 is reduced on the catalyst with the electrons released by the metal/hydroxyl ion reaction and combines with water of the electrolyte in air cathode 20 to form hydroxyl ions. The metal hydroxide in slurry 18 eventually decays to a metal oxide and water, so that the cell does not consume water and the net chemical reaction is oxidation of metal in anode slurry 18 and reduction of atmospheric oxygen in air cathode 20 to produce a metal oxide and electrical current.

A first challenge when operating a metal-air electrochemical cell is that evaporation of water from the aqueous electrolyte in the air cathode eventually renders the cell inoperable.

A second challenge when operating a metal-air electrochemical cell is that atmospheric carbon dioxide that dissolves in the electrolyte in the air cathode forms a carbonate precipitate in the air cathode.

To overcome these two challenges, it is accepted to place a gas-diffusion membrane such as 26 on the perforated cover 24 of the cell.

Gas-diffusion membranes such as 26 comprise a matrix (typically a solid, e.g., a polymer) that defines pores providing fluid communication from a first side of the membrane to the second side of the membrane. Gas molecules pass from one side of the membrane to the other by simple diffusion through the pores (e.g., from ambient air 28 to air cathode 20 and back). If the geometry of the pores is such as to substantially reduce the rate of passage of gases between ambient air 28 and air cathode 20 (e.g., the pores are sufficiently small and/or tortuous), such typical gas-diffusion membranes, e.g. 26, reduce the rate of water evaporation from and the rate of carbon dioxide entry into the electrolyte of air cathode 20.

Typical gas-diffusion membranes are non-selective: there is no chemical interaction between the matrix and pores with individual molecules so that all types of gas molecules pass through the membrane by simple diffusion. The rate of diffusion of a specific molecule through a membrane is dependent on factors such as temperature, the thickness of the membrane and a constant depending on the geometry of the pores of membrane, for example, number, interconnectivity, tortuosity and size of the pores, that are typically defined by the nature of the matrix. For example, when the matrix is a polymer, polymer identity, chain length, extent of cross-linking, density and hardness are all factors that may have influence on the geometry of the pores through the membrane.

A problem associated with use of such non-selective gas-diffusion membranes is that the membranes also limit the rate at which atmospheric oxygen enters the air cathode, thereby limiting the power produced by the metal-air electrochemical cell to the rate at which atmospheric oxygen diffuses through the membrane: the maximum power cannot exceed the power dictated by the maximum rate of oxygen entry.

Selectively-permeable membranes are a type of membrane which comprise a matrix (as described above) and also a carrier (a chemical entity that selectively reversibly bonds to one or more types of molecules) functionally associated with the matrix. Molecules that do not bond to the carrier pass through the selectively-permeable membrane by simple diffusion as described above. Molecules that selectively reversibly bond to the carrier pass through the selectively-permeable membrane by facilitated diffusion that typically includes, in addition to simple diffusion, one or more mechanisms that include reversible bonding of the molecules to the carrier.

Some selectively-permeable membranes are oxygen-selective membranes that comprise a carrier that selectively reversibly binds to oxygen molecules. Some oxygen-selective membranes increase the rate of passage of oxygen molecules therethrough relative to the rate of passage of other molecules. Such oxygen-selective membranes have the potential of mitigating at least some of the challenges to operating metal-air electrochemical cells by increasing the rate of oxygen passage through the membrane relative to rate of passage of other gases, especially water and carbon dioxide. Non-biological oxygen-selective membranes are known for use as gas diffusion membranes in the field of metal-air electrochemical cells and fuel cells, see for example:

"Modelling of operation of a lithium-air battery with ambient air and oxygen-selective membrane" by Sahapatsombuta U, Cheng H and Scott K in J Power Sourc 2014, 249, 418-430;

"Oxygen selective membranes for Li-Air ($O_2$) Batteries" by Crownther O and Salomon M in Membranes (2012)2, 216; and "Highly Selective Oxygen Permeation through a Poly(vinylidene dichloride)-Cobalt Porphyrin Membrane: Hopping Transport of Oxygen via the Fixed Cobalt Porphyrin Carrier" by Nishide H, Tsukahara Y, and Tsuchida E in J. Phys. Chem. B, 1998, 102 (44), 8766-8770 all which are included by reference as if fully set-forth herein.

SUMMARY OF THE INVENTION

Some embodiments of the invention herein relate to selectively-permeable membranes that, in some embodiments, are useful for facilitated diffusion of specified molecules from one fluid to another, for example, oxygen-selective membranes useful for facilitated diffusion of oxygen molecules from one fluid to another.

According to an aspect of some embodiments of the invention there is provided a component configured for selective permeation of a specified gas therethrough, the component comprising:
  a. a first side, a second side and a support structure with a plurality of holes passing through the support structure from the first side to the second side;
  b. spanning the holes, selectively-permeable membranes that are selectively-permeable to a specified gas, the selectively-permeable membranes comprising:
    i. a first side and a second side;
    ii. a polymer matrix configured to allow passage of gases through the membrane between the first side and the second side by simple diffusion; and
    ii. functionally associated with the polymer matrix, at least one carrier that preferentially reversibly binds the specified gas,
wherein at least one of the first side and second side of the membranes (in some preferred embodiments, both the first side and the second side of the membranes) are patterned with a plurality of depressions so that the selectively-permeable membranes comprise thinner regions of the polymer matrix and thicker regions of the polymer matrix. In some embodiments, the depressions are surrounded by a raised border of matrix. In some preferred embodiment, the specified gas is oxygen so that the carrier preferentially reversibly binds oxygen ($O_2$ gas) and the membrane is thereby an oxygen-selective membrane.

According to an aspect of some embodiments of the invention, there is also provided a method of making a component configured for selective permeation of a specified gas therethrough, comprising:
  i. providing a dipping solution including: a polymer, a carrier, and a volatile solvent;
  ii. subsequent to i, immersing in the dipping solution a support structure with a plurality of holes passing through the support structure from a first side to a second side of the support structure;
  iii. subsequent to ii, removing the support structure from the dipping solution so that the support structure is coated with the dipping solution; and
  iv. subsequent to iii, maintaining the support structure in an atmosphere while the support structure is in a position where the first side and the second side are substantially parallel with a gravity vector, thereby allowing the volatile solvent to evaporate into the atmosphere thereby forming the selectively-permeable membrane spanning the holes of the support structure, thereby making a component configured for selective permeation of a specified gas therethrough according to the teachings herein.

According to an aspect of some embodiments of the invention, there is also provided a non-biological selectively-permeable membrane that is preferably permeable to a specified gas, having a first side, a second side and comprising:
  a. a polymer matrix configured to allow passage of gases through the membrane between the first side and the second side by simple diffusion; and
  b. functionally associated with the polymer matrix, at least one carrier that preferentially reversibly binds the specified gas, wherein the polymer matrix comprises polymerized polycarbonate monomers.

According to an aspect of some embodiments of the invention, there is provided a non-biological selectively-permeable membrane that is preferably permeable to oxygen, having a first side, a second side and comprising:
  a. a polymer matrix configured to allow passage of gases through the membrane between the first side and the second side by simple diffusion; and
  b. functionally associated with the polymer matrix, at least one carrier that preferentially reversibly binds to oxygen, wherein at least one carrier is a metal complex of a phthalocyanine, and the membrane is an oxygen-selective membranes.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. As used herein, the indefinite articles "a" and "an" mean "at least one" or "one or more" unless the context clearly dictates otherwise. As used herein, when a numerical value is preceded by the term "about", the term "about" is intended to indicate +/−10%.

As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C), (B and C) or (A and B and C).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Some embodiments of the invention herein relate to selectively-permeable membranes that, in some embodiments, are useful for facilitated diffusion of specified molecules from one fluid to another, for example, oxygen-selective membranes useful for facilitated diffusion of oxygen molecules from one fluid to another.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As discussed in the introduction, selectively-permeable membranes are a type of membrane which comprise a matrix and a carrier (a chemical entity that selectively reversibly bonds to one or more types of molecules) functionally associated with the matrix. Molecules that do not bond to the carrier (e.g., helium, argon, neon) pass through the selectively-permeable membrane by simple diffusion. Molecules that selectively reversibly bond to the carrier pass through the selectively-permeable membrane by facilitated diffusion that typically includes, in addition to simple diffusion, one or more mechanisms that include reversible bonding to the carrier. One desirable type of selectively-permeable membrane is an oxygen-selective membrane that comprise a carrier that selectively reversibly binds to oxygen molecules functionally associated with the matrix of the selectively-permeable membrane.

Some embodiments of the invention herein relate to selectively-permeable membranes that, in some embodiments, are useful for facilitated diffusion of specified molecules from one fluid to another, for example, oxygen-selective membranes useful for facilitated diffusion of oxygen molecules from one fluid to another, for example from one gas to another gas, e.g., from ambient air to an air cathode, e.g., of an electrochemical cell.

Component According to the Teachings Herein

Thus, according to an aspect of some embodiments of the teachings herein there is provided a component configured for selective permeation of a specified gas therethrough, the component comprising:

a. a first side, a second side and a support structure with a plurality of holes passing through the support structure from the first side to the second side;

b. spanning the holes, selectively-permeable membranes that are selectively-permeable to a specified gas, the selectively-permeable membranes comprising:

i. a first side and a second side;

ii. a polymer matrix configured to allow passage of gases through the membrane between the first side and the second side by simple diffusion; and iii. functionally associated with the polymer matrix, at least one carrier that preferentially reversibly binds the specified gas, wherein at least one of the first side and second side of the membranes (in some preferred embodiments, both the first side and the second side of the membranes) are patterned with a plurality of depressions so that the selectively-permeable membranes comprise thinner regions of the polymer matrix and thicker regions of the polymer matrix. In some embodiments, the depressions are surrounded by a raised border of matrix. In some preferred embodiment, the specified gas is oxygen so that the carrier preferentially reversibly binds oxygen ($O_2$ gas) and the membrane is thereby an oxygen-selective membrane.

Figure 2:
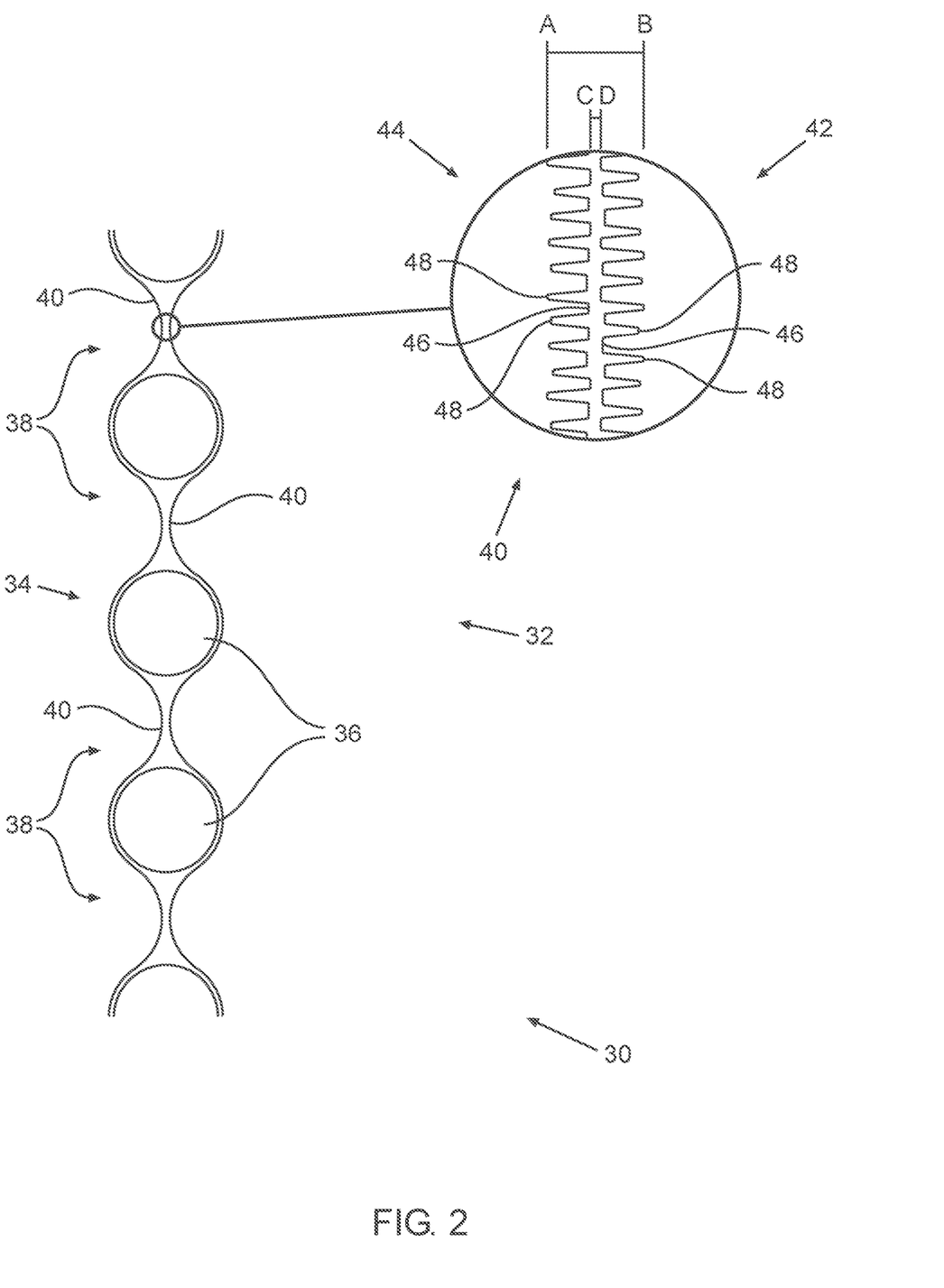
FIG. 2 is a schematic depiction of an embodiments of a component comprises a selectively-permeable membrane according to the teachings herein in side cross-section.

In FIG. 2, a portion of a component 30 according to an embodiment of the teachings herein is schematically depicted in side cross section having a first side 32, a second side 34 and a support structure 36. In FIG. 2, a portion of support structure 36 is seen as a cross section of five horizontal wires of a mesh. A plurality of holes 38 (the gaps between the wires constituting the mesh, four holes 38 are depicted in FIG. 2) pass through support structure 36 from first side 32 to second side 34.

Spanning each hole 38 is a selectively-permeable membrane 40 that is selectively-permeable to a specified gas (e.g., oxygen) having a first side 42 and a second side 44, selectively-permeable membrane 40 comprising a polymer matrix configured to allow passage of gases through membrane 40 between first side 42 and second side 44 by simple diffusion; and functionally associated with the polymer matrix, at least one carrier that preferentially reversibly binds the specified gas, wherein both first side 42 and second side 44 are patterned with a plurality of depressions 46, each depression surrounded by a raised border 48 of matrix. As a result of the depressions 46, (and raised borders 48) selectively-permeable membrane 40 comprises thinner regions of the polymer matrix and thicker regions of the polymer matrix. It is important to emphasize that FIG. 2 is purely illustrative to better understand the invention and the parts and components depicted therein are not drawn to scale, especially not the relative dimensions of holes 38, the membranes 40 and depressions 46.

Figure 3:
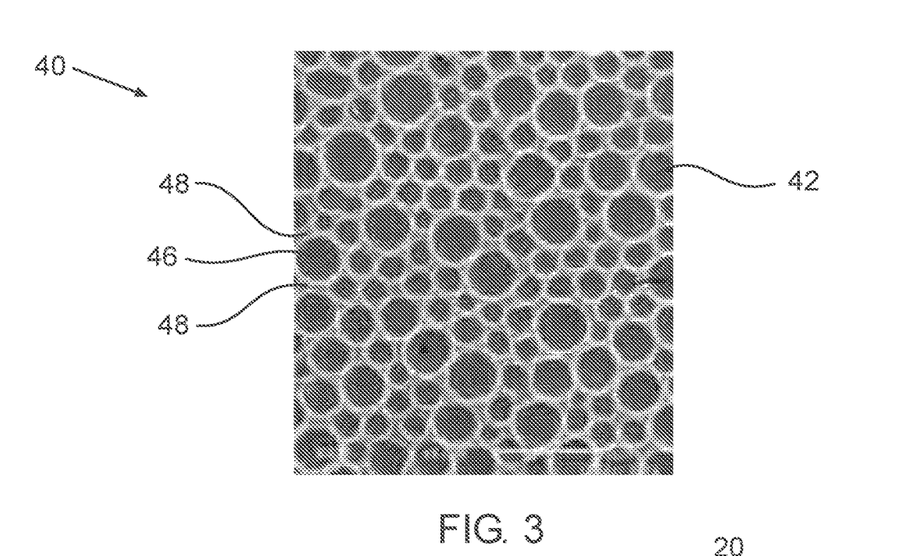
FIG. 3 is a speculative scanning electron microscopy image of a side of a component according to the teachings herein.

In FIG. 3 is depicted a speculative scanning electron microscopy image of a first side 42 of a membrane 40 of a component according to the teachings herein, wherein mostly circular depressions 46 surrounded by raised borders 48 are seen.

Membranes

As noted above, in some embodiments a component according to the teachings herein comprises selectively-permeable membranes that span the holes of the support structure.

The selectively-permeable membranes of the component comprise a polymer matrix configured to allow passage of gases through the membrane between the first side and the second side by simple diffusion. As known in the art, by a polymer matrix configured to allow passage of gases through the membrane between the first side and the second side by simple diffusion is meant that noble gases such as helium, neon and argon are able to diffuse through the membrane without forming bonds with the polymer matrix. As known in the art, typically the polymer matrix defines pores that provide the fluid communication between the first side and the second side through which gases diffuse.

As also known in the art, a selectively-permeable membrane that is selectively-permeable to a specified gas is a membrane for which the specified gas has a relatively higher rate of diffusion therethrough than for other gases. This relatively higher rate of diffusion is a result of facilitated diffusion of the specified gas through the membrane due to the existence of mechanisms for passage of the specified gas through the membrane in addition to simple diffusion.

In some embodiments, the preferential reversible binding of the specified gas to at least one carrier allows passage of the specified gas through the membranes at a rate higher than a rate determined by simple diffusion, (e.g., as determined by diffusion through an otherwise identical membrane devoid of the at least one carrier).

In some embodiments, the preferentially reversible binding of the specified gas to at least one carrier allows passage of the specified gas through the membranes between the first side and the second side by facilitated diffusion that includes a step of binding between a molecule of specified gas and the at least one carrier.

In some embodiments, the polymer matrix encases the support structure. In component 30 depicted in FIG. 2, polymer matrix encases support structure 36.

The membranes have any suitable thickness to provide for the desired balance of relatively high permeability for the specified gas, relatively low permeability for non-specified gases and sufficient physical robustness so that the membrane does not rupture during use.

In some embodiments the membrane thickness at the center of a respective hole (in FIG. 2, the thickness of membrane 40 A-B at the center of a hole 38 as measured across a raised border 48 on first side 42 and a raised border 48 on second side 44) is not more than 100 micrometers, not more than 50 micrometers, not more than 20 micrometers and even not more than 10 micrometers. In some embodiments, the membrane thickness is not less than 1 micrometer, not less than 2 micrometers and even not less than 3 micrometers. In some typical embodiments, the membrane thickness is not less than 1 micrometer and not more than 100 micrometers. In some typical embodiments, the membrane thickness is not less than 2 micrometers and not more than 20 micrometers. In some typical embodiments, the membrane thickness is not less than 3 micrometers and not more than 10 micrometers. In this context, it is important to note that the "height" of the raised borders e.g., 48 (the dimension perpendicular to the plane of the membrane) and therefore the membrane thickness (A-B in FIG. 2) is not uniform. That said, the above-recited exemplary dimensions relate to dimensions of not less than 80% of the raised borders in the center of a membrane according to the teachings herein.

In some embodiments the permeation thickness at the center of a respective hole (in FIG. 2, the thickness of membrane 40 C-D measured perpendicularly to the plane of the membrane at the center of a hole 38 as measured across the bottom of a depression 46 on first side 42 and the bottom of a depression 46 on second side 44) is not more than 800 nanometers, not more than 500 nanometers, not more than 400 nanometers and even not more than 300 nanometers. In some embodiments, the permeation thickness is not less than 20 nanometers, not less than 50 nanometers and even not less than 100 nanometers. In some typical embodiments, the permeation thickness is not less than 20 nanometers and not more than 800 nanometers. In some typical embodiments, the membrane thickness is not less than 50 nanometers and not more than 500 nanometers. In some typical embodiments, the membrane thickness is not less than 100 nanometers and not more than 300 nanometers. In this context, it is important to note that the "depth" of the depressions e.g., 46 (the dimension perpendicular to the plane of the membrane) and therefore the permeation thickness (C-D in FIG. 2) is not uniform. That said, the above-recited exemplary dimensions relate to dimensions of not less than 80% of the raised borders in the center of a membrane according to the teachings herein.

In some embodiments, most (not less than 50%) of the depressions of the plurality of depressions are circular, for example, as depicted in FIG. 3. In some embodiments, not less than 60% and even not less than 70% of the plurality of depressions are circular.

The size of each depression at the surface of the membrane is any suitable size. As used herein, the size of the depression is the size of the opening of the depression at the surface of the membrane as delineated by the surrounding raised border, for example, as would be observed and determined using scanning electron microscopy such as depicted in FIG. 3). In some embodiments where the depressions are substantially circular, a majority of the depressions have a diameter of not less than 1 micrometer and not more than 500 micrometer and in some such embodiments a majority of the depressions have a diameter of not less than 5 micrometer and not more than 50 micrometer.

Accordingly, in some embodiments a majority of the depressions have a surface area of not less than 0.8 micrometer$^2$ (equivalent to a 1 micrometer diameter circle), not less than 3 micrometer$^2$ (equivalent to a 2 micrometer diameter circle), and even not less than 20 micrometer$^2$ (equivalent to a 5 micrometer diameter circle).

In some embodiments a majority of the depressions have a surface area of not more than 200,000 micrometer$^2$ (equivalent to a 500 micrometer diameter circle), not more than 8000 micrometer$^2$ (equivalent to a 100 micrometer diameter circle) and even not more than 2000 micrometer$^2$ (equivalent to a 50 micrometer diameter circle).

In some embodiments a majority of the depressions have a surface area of not less than not less than 0.8 micrometer$^2$ and not more than 200,000 micrometer$^2$.

In some such embodiments, the majority of the depressions is not less than 50%, not less than 60%, not less than 70%, not less than 80%, not less than 90% and even not less than 95% of the depressions.

In some embodiments, the first side and the second side of the component are parallel. In FIG. 2, first side 32 and second side 34 are parallel.

Support Structure

As noted above, in some embodiments a component according to the teachings herein comprises a support structure with a plurality of holes 38 passing through the support structure from the first side to the second side of the component.

In some embodiments, the support structure has width and length dimensions that are not less than ten times greater than a thickness dimension of the component, wherein the thickness dimension is the dimension between the first side and the second side of the component. In FIG. 2, support structure 36 has width and length dimensions that are not less than ten times greater than a thickness dimension.

In some embodiments, the membranes are equidistant from the first side and the second side of the component, e.g., are coplanar with the support structure, for example as depicted in FIG. 2.

The support structure is any suitable thickness. If the support structure is too thin the component may be too flimsy for practical use and the membranes to thin to provide a real difference in diffusion rate between the specified gas and other gases. If the support structure is too thick, the membranes may not form (the required curvature for the membranes in the holes of the support structure is not attainable) or the membranes may be too thick so that the rate of diffusion through the membranes is too low for the component to be practical. In some embodiments, the support structure is not less than 20 micrometers thick and even not less than 30 micrometers thick. In some embodiments, the support structure is not more than 2000 micrometers thick, not more than 1500, not more than 1000, not more than 900, not more than 800 and even not more than 700 micrometers thick. In some embodiments, the support structure is not less than 20 micrometers thick and not more than 2000 micrometers thick. In the experimental section are described components according to the teachings herein having two different thicknesses, a first support structure being 500 micrometers thick and a second support structure being 33 micrometers thick.

Any suitable support structure may be used. In some embodiments, the support structure comprises a solid links-and-node structure that defines the holes, for example, the support structure is a component selected from the group consisting of a mesh, a net, a web, an expanded mesh, a woven mesh, a perforated sheet, and a latticework. In the experimental section are described components according to the teachings herein having support structures that are woven meshes of stainless steel threads.

The size of the holes of the support structure are any suitable size: suitable membranes are unlikely to be supported when the holes that are too large or too small.

In some embodiments, the holes of the support structure have a cross-sectional area of not more than 1,000,000 micrometer$^2$ (equivalent to a square of 1×1 mm), 810,000 micrometer$^2$ (equivalent to a square of 900×900 micrometer), 640,000 micrometer$^2$ (equivalent to a square of 800× 800 micrometer) and even 360,000 micrometer$^2$ (equivalent to a square of 600×600 micrometer).

In some embodiments, the holes of the support structure have a cross-sectional area of not less than 400 micrometer$^2$ (equivalent to a square of 20×20 micrometer) and even not less than 900 micrometer$^2$ (equivalent to a square of 30×30 micrometer).

In the experimental section are described components having support structures with holes that are squares of 500×500 micrometers or squares of 33×33 micrometer.

In some embodiments, the component is self-supporting. In some embodiments, the support structure is self-supporting and therefore the component is also self supporting. By self supporting is meant that the component/support structure has some rigidity and is not compliant like a silk fabric. In some embodiments, self-supporting is determined by placing the center point of a 2 cm×2 cm square of the component/support structure on the point of a sharpened 7 mm width pencil: the component/support structure is self-supporting if the component/support structure does not collapse to touch more than two opposing sides of the pencil although the component/support structure is still self-supporting if it bends along a single line to touch the pencil on two opposing sides.

The support structure is of any suitable material. In some embodiments, the support structure is of a material selected from the group consisting of a metal and a polymer. In the experimental section are described components according to the teachings herein having support structures that are woven meshes of stainless steel threads.

Polymer Matrix

As noted above, in some embodiments, the membranes spanning the holes of the support structure comprise a polymer matrix configured to allow passage of gases through the membrane between the first side and the second side by simple diffusion. A suitable polymer matrix must define pores between the first side and the second side that have suitable geometry (e.g., in terms of number, interconnectivity, tortuosity, size of the pores and the like) that, for the thickness of the membrane, allow diffusion at a rate that is neither to quick nor to slow. Any suitable polymer or combination of polymers may be used for implementing the teachings herein.

That said, in some embodiments, the polymer matrix comprises polymerized monomers selected from the group consisting of polycarbonate monomers, poly(vinylidene dichloride) monomers and polysulfone monomers.

In some preferred embodiments, the polymer matrix comprises polymerized polycarbonate monomers. In some such embodiments, the polymer matrix comprises not less than 80%, not less than 90% and even not less than 95% by weight polycarbonate monomers. In some such embodiments, at least 80%, at least 90% and even at least 95% by weight of the polycarbonate monomers are bisphenol A carbonate. In the experimental section are described membranes that comprised a polymer matrix that was 100% by weight poly (bisphenol A carbonate).

As is known to a person having ordinary skill in the art, the properties of a polymer matrix are determined not only by the nature of the constituent monomers but also by the chain length, e.g., as expressed in terms of average molecular weight, of the polymers making up the polymer matrix. Any suitable average molecular weight of polymer may be used in implementing the teachings herein. That said, in some embodiments, the polymers making up the polymer matrix have an average molecular weight of not less than 10000, not less than 15000 and even not less than 20000. In some embodiments, polymers making up the polymer matrix having an average molecular weight of not more than 100,000, not more than 80,000, and even not more than 60,000. In some such embodiment, the polymers making up the polymer matrix have an average molecular weight of not less than 10000 and not more than 100,000. In the experimental section are described membranes which polymer matrices are made up of polymers having an average molecular weight of 28000, 34100 and 56400.

Carrier

As noted above, in some embodiments, the membranes spanning the holes of the support structure comprise a carrier that preferentially reversibly binds the specified gas functionally associated with the polymer matrix, so that the membrane is a selectively-permeable membrane. Any suitable single carrier or combination of different carriers may be used in implementing the teachings herein.

As noted above, the carrier is functionally-associated with the polymer matrix. Any suitable type of functional association may be used for implementing the teachings herein.

In some embodiments, at least one carrier of the at least one carriers is covalently bonded to molecules of the polymer matrix, and thereby functionally associated therewith. In some such embodiments, at least one carrier of the one or more carriers is a functional group that is covalently bonded to the polymer, for example, as part of the polymer backbone (e.g., is a functional group of a monomer or, if the polymer is a copolymer, a functional group of one or more of the monomers thereof), a functional group of an entity grafted to the polymer backbone, or a functional group of a cross-linker.

In some embodiments, at least one carrier of the at least one carriers is a chemical entity distinct from the polymer matrix, e.g., a molecule different from the polymer chain or a particle that is not covalently bonded to the polymer chain. In some such embodiments, the distinct chemical entity is dispersed in the polymer matrix. In some such embodiments, the distinct chemical entity is solvated in the polymer matrix. In some embodiments, the distinct chemical entity is absorbed in the polymer matrix. In some such embodiments, the distinct chemical entity is adsorbed to the polymer matrix.

When at least one carrier is a chemical entity distinct from the polymer matrix, any suitable amount of the distinct chemical entity may be used in implementing the teachings herein. In some such embodiments, the weight ratio of the distinct chemical entity that is a carrier to polymer matrix is not less than 25:100 and even not less than 50:100. In some such embodiments, the weight ratio of the distinct chemical entity that is a carrier to polymer matrix is not more than 250:100 and even not more than 200:100. In some such embodiments, the weight ratio of the distinct chemical entity that is a carrier to polymer matrix is not less than 25:100 and not more than 250:100.

Any suitable carrier may be used for implementing the teachings herein, thereby allowing any gas to be the specified gas. In some preferred embodiments, the specified gas is oxygen ($O_2$) so that the carrier preferentially reversibly binds oxygen and the membranes are oxygen-selective membranes.

In some embodiments, at least one carrier of the at least one carriers is a metal complex of an organic compound selected from the group consisting of a phthalocyanine, a porphyrin and a corrole and in some preferred such embodiments, at least one carrier is a metal complex of a phthalocyanine. In some such embodiments, the metal component of the organic-metal complex is selected from the group consisting of iron and cobalt.

In some embodiments, at least one carrier of the at least one carriers is metal particles, in some such embodiments the metal of the particles selected from the group consisting of cobalt, platinum, palladium, nickel, copper, manganese, ruthenium and iron. In some such embodiments, the metal particles are nanoparticles of metal, that is to say, particles of any shape having at least two dimensions not greater than 100 nm, and in some embodiments particles of any shape where all three dimensions are not greater than 100 nm.

In the experimental section are described oxygen-selective membranes that comprise a single carrier iron (II) phthalocyanine that preferentially reversibly binds oxygen dissolved in the polymer matrix. The iron(II) phthalocyanine is a chemical entity distinct from the polymer matrix that is solvated in the polymer matrix and thereby dispersed in the polymer matrix. The weight ratio of the iron(II) phthalocyanine to polymer matrix is between 82:100 and 170:100.

Plasticizer

In some embodiments, the membrane further comprises a plasticizer.

In some embodiments, the weight ratio of plasticizer to polymer matrix is not less than 1:100 and even not less than 2:100. In some embodiments, the weight ratio of plasticizer to polymer matrix is not more than 20:100 and even not more than 15:100. In some such embodiments, the weight ratio of plasticizer to polymer matrix is not less than 1:100 and not more than 20:100.

In the experimental section are described membranes that comprise a plasticizer to polymer matrix weight ratio of 5:100 and 10:100.

Any suitable plasticizer may be used in implementing the teachings herein. In some embodiments, the plasticizer comprises an organosilicon compound. In some embodiments, the plasticizer consists of an organosilicon compound. In some embodiments, the plasticizer comprises methyltrimethoxysilane, octamethylcyclotetrasiloxane or combinations thereof. In some embodiments, the plasticizer consists of methyltrimethoxysilane, octamethylcyclotetrasiloxane or combinations thereof.

In some embodiments, the plasticizer comprises an organic carbonate, in some embodiments selected from the group of organic carbonates consisting of alkyl carbonates, ethylene carbonate, propylene carbonate, dibutyl carbonate and mixtures thereof. In some embodiments, the plasticizer consists of an organic carbonate.

Hydrophilic Coating

In some embodiments, the component further comprises a hydrophilic coating on at least one of the two sides. In some embodiments, there is a hydrophilic coating on both sides. In some embodiments, the hydrophilic coating comprises PVP (polyvinylpyrrolidone). In some embodiments, the hydrophilic coating consists of PVP.

Method of Making a Component According to the Teachings Herein

A component as described above may be made using any suitable method. In some embodiments, it is preferred to use the method according to the teachings herein.

It has been found that components as described above may be made using dip-coating of a support structure.

Thus, according to an aspect of some embodiments of the teachings herein, there is also provided a method of making a component configured for selective permeation of a specified gas therethrough, comprising:

i. providing a dipping solution including:
   a polymer;
   a carrier; and
   a volatile solvent;
ii. subsequent to i, immersing in the dipping solution a support structure with a plurality of holes passing through the support structure from a first side to a second side of the support structure;
iii. subsequent to ii, removing the support structure from the dipping solution so that the support structure is coated with the dipping solution; and
iv. subsequent to iii, maintaining the support structure in an atmosphere while the support structure is in a position where the first side and the second side are substantially parallel with a gravity vector, thereby allowing the volatile solvent to evaporate into the atmosphere thereby forming the selectively-permeable membrane spanning the holes of the support structure, thereby making a component configured for selective permeation of a specified gas therethrough according to the teachings herein, for example, a component as described above.

The importance of the first side and second side being substantially parallel with the gravity vector is that this allows relatively thin and homogeneous membranes to form in the holes of the support structure with relatively few defects despite the fact that (presumably) the upper portion of a given membrane is expected to be thinner than a lower portion of that given membrane. In some such embodiments, the importance is that the membranes form coplanarly with a central plane running through the center of the support structure. In some embodiments, by "substantially parallel with the gravity vector" is mean that both the first side and the second side are within 25°, within 20°, within 15° and even within 10° of parallel to the gravity vector. In some preferred embodiments, by "substantially parallel with the gravity vector" is mean that both the first side and the second side are within 5° of parallel to the gravity vector.

In some embodiments, the method further comprises: during the removing of the support structure from the dipping solution, maintaining the first side and the second side of the support structure substantially parallel with the gravity vector.

Support Structure

Any suitable support structure may be used for implementing the method of the teachings herein. In some embodiments, it is preferred to use a support structure having one or more of the characteristics described above in the description of embodiments of the component. For the sake of brevity, the characteristics of the support structure are nor repeated here.

Volatile Solvent

Without wishing to be held to any one theory, it is currently believed that while the support structure is maintained in an atmosphere during 'iv', the evaporation of the solvent into the atmosphere cools the surface of the incipient membrane formed in the holes of the support structure. This cooling is sufficient to lead to condensation of water from the atmosphere as droplets on the surface on the incipient membrane, the location where the droplets condense leading to the formation of the pattern of depressions on the first side and/or second side of the membranes.

The volatile solvent is any suitable volatile solvent.

In some embodiments, at least 95% by weight of the volatile solvent has a vapor pressure of not less than 13300 Pa (100 mm Hg) at 25° C.

In some embodiments, the volatile solvent comprises dichloromethane which has a vapor pressure of 58000 Pa (435 mm Hg) at 25° C.

In some embodiments, the volatile solvent comprises chloroform which has a vapor pressure of 26300 Pa (197 mm Hg) at 25° C.

In some embodiments, the volatile solvent comprises a mixture of dichloromethane and chloroform. In some embodiments, the volatile solvent consists of a mixture of dichloromethane and chloroform.

In the experimental section is described a dipping solution that included a volatile solvent consisting of a 9:1 (v/v) mixture dichloromethane with chloroform.

Atmosphere

The atmosphere in which the volatile solvent is allowed to evaporate is any suitable atmosphere.

As noted above, in some embodiments it is preferred that the atmosphere have sufficient humidity to allow condensation of water droplets on the surface of the incipient membranes. In some embodiments, the atmosphere has a relative humidity of not less than 20%, not less than 23%, and even not less than 25%. In some embodiments, the atmosphere has a relative humidity of not more than 40% and even not more than 35%. In some embodiments, the atmosphere has a relative humidity of not less than 20% and not more than 40%.

The pressure of the atmosphere is any suitable pressure. In some embodiments, the pressure is between 86700 Pa and 107000 Pa (650 and 800 mm Hg). That said, in some preferred embodiments, the atmosphere is ambient air at atmospheric pressure.

The temperature of the atmosphere during the evaporation of the volatile solvent is any suitable temperature, typically room temperature. In some embodiments, the temperature of the atmosphere is between 5° and 50° C. That said, in some preferred embodiments the temperature of the atmosphere is between 10° and 42° C. and even between 15° and 30° C.

In the experimental section is described that the volatile solvent was allowed to evaporate in the ambient air determined to have a relative humidity between 27% and 33% and at a temperature of between 18° and 25° C.

Polymer

Any suitable polymer may be used for implementing the method of the teachings herein. In some embodiments, it is preferred to use a polymer having one or more of the characteristics described above for the polymer matrix in the description of embodiments of the component. For the sake of brevity, the characteristics of the polymer are nor repeated here.

The concentration of polymer in the dipping solution may be any suitable concentration.

In some embodiments, the concentration of the polymer in the dipping solution is not less than 5% by weight of the dipping solution.

In some embodiments, the concentration of the polymer in the dipping solution is not more than 20% by weight of the dipping solution.

In some embodiments, the concentration of the polymer in the dipping solution is not less than 5% and not more than 20% by weight of the dipping solution In the experimental section are described dipping solutions that included 9.1%, 11% and 15% by weight polymer.

Carrier

Any suitable carrier may be used for implementing the method of the teachings herein. In some embodiments, it is preferred to use a carrier having one or more of the characteristics described above for the carrier in the description of embodiments of the component. For the sake of brevity, the characteristics of the carrier are nor repeated here.

The concentration of carrier in the dipping solution may be any suitable concentration.

In some embodiments, a concentration of the carrier in the dipping solution is not less than 2% and even not less than 5% by weight of the dipping solution.

In some embodiments, a concentration of the carrier in the dipping solution is not more than 35% and even not more than 30% by weight of the dipping solution.

In some embodiments, a concentration of the carrier in the dipping solution is not less than 2% and not more than 30% by weight of the solution.

In the experimental section are described dipping solutions that included 7.5%, 9.1% and 25% by weight carrier.

Plasticizer

In some embodiments, the dipping solution further comprises a plasticizer. Any suitable plasticizer may be used for implementing the method of the teachings herein. In some embodiments, it is preferred to use a plasticizer having one or more of the characteristics described above for the plasticizer in the description of embodiments of the component. For the sake of brevity, the characteristics of the plasticizer are not repeated here.

The concentration of plasticizer in the dipping solution may be any suitable concentration.

In some embodiments, the concentration of the plasticizer in the dipping solution is such that the weight ratio of plasticizer to polymer in the dipping solution is not less than 1:100 and even not less than 2:100.

In some embodiments, the concentration of the plasticizer in the dipping solution is such that the weight ratio of plasticizer to polymer in the dipping solution is not more than 20:100 and even not more than 15:100.

In some embodiments, the concentration of the plasticizer in the dipping solution is such that the weight ratio of plasticizer to polymer in the dipping solution is not less than 1:100 and not more than 20:100.

In the experimental section are described dipping solutions that included plasticizer such that the weight ratio of plasticizer to polymer in the dipping solution was 5:100 and 10:100.

Hydrophilic Treatment

In some embodiments, the method further comprises: subsequent to iv, treating at least one of the sides of the formed selectively-permeable membrane spanning the holes of the support structure to increase the hydrophilicity thereof so that the contact angle of a droplet of water on the selectively-permeable membrane is reduced relative to an untreated such formed selectively-permeable membrane. In some embodiments, the method comprises treating both sides of the membrane.

In some embodiments, such treating comprises coating at least one side of the formed selectively-permeable membrane spanning the holes of the support structure with a material that increases the hydrophilicity thereof. In some embodiments, such treating consists of coating at least one side of the formed selectively-permeable membrane spanning the holes of the support structure with a material that increases the hydrophilicity thereof.

In some embodiments, the coating comprises spraying the material on the at least one side. In some embodiments, the coating comprises spraying a solution comprising the material on the at least one side.

In some embodiments, the material comprises PVP (polyvinylpyrrolidone). In some embodiments, the material consists of PVP.

Selectively-Permeable Membrane Comprising Polycarbonate Polymer Matrix

As noted previously herein, a selectively-permeable membrane requires a matrix that defines pores that allows diffusion of gases therethrough. The pores must have a geometry suitable for diffusion at a membrane thickness that is sufficiently strong for practical use. More flimsy polymers must be made into thick membranes through which gas diffusion is potentially impossible or impractically slow. Excessively robust polymers may necessitate forming very thin membranes to allow sufficient diffusion therethrough, such thin membranes prone to defects during the manufacturing process. Additionally, it must be possible to functionally associate a suitable amount of suitable carrier with the polymer matrix. Clearly, it is no simple task to find a polymer that is suitable for use as a polymer matrix for making a selectively-permeable membrane, and it is a virtually impossible task to find conditions that allow making such a membrane from a suitable polymer.

As disclosed herein, the Inventors have discovered that it is possible to make a selectively-permeable membrane having a polymer matrix that comprises polycarbonate.

Thus, according to an aspect of some embodiments of the teachings herein, there is provided a non-biological selectively-permeable membrane that is preferably permeable to a specified gas, having a first side, a second side and comprising:

a. a polymer matrix configured to allow passage of gases through the membrane between the first side and the second side by simple diffusion; and b. functionally associated with the polymer matrix, at least one carrier that preferentially reversibly binds the specified gas, wherein the polymer matrix comprises polymerized polycarbonate monomers.

The selectively-permeable membrane which polymer matrix comprises polymerized polycarbonate monomers comprise a polymer matrix configured to allow passage of gases through the membrane between the first side and the second side by simple diffusion. As discussed above, typically the polymer matrix defines pores that provide the fluid communication between the first side and the second side through which gases diffuse. As also known in the art, a selectively-permeable membrane that is selectively-permeable to a specified gas is a membrane for which the specified gas has a relatively higher rate of diffusion therethrough than for other gases that is a result of facilitated diffusion of the specified gas through the membrane. In some embodiments, the preferential reversible binding of the specified gas to at least one carrier allows passage of the specified gas through the membranes at a rate higher than a rate determined by simple diffusion. In some embodiments, the preferentially reversible binding of the specified gas to at least one carrier allows passage of the specified gas through the membrane between the first side and the second side by facilitated diffusion that includes a step of binding between a molecule of specified gas and the at least one carrier.

The polymer matrix comprises any suitable amount of polymerized polycarbonate monomers. In some such embodiments, the polymer matrix comprises not less than 80%, not less than 90% and even not less than 95% by weight polycarbonate monomers. In some such embodiments, at least 80%, at least 90% and even at least 95% by weight of the polycarbonate monomers are bisphenol A carbonate. In the experimental section are described membranes that comprised a polymer matrix that was 100% by weight poly (bisphenol A carbonate).

Any suitable average molecular weight of polymer making up the polymer making up the polymer matrix may be used in implementing the teachings herein. That said, in some embodiments, the polymers making up the polymer matrix have an average molecular weight of not less than 10000, not less than 15000 and even not less than 20000. In some embodiments, polymers making up the polymer matrix having an average molecular weight of not more than 100,000, not more than 80,000, and even not more than 60,000. In some such embodiment, the polymers making up the polymer matrix have an average molecular weight of not less than 10000 and not more than 100,000. In the experimental section are described membranes which polymer matrices are made up of polymers having an average molecular weight of 28000, 34100 and 56400.

Carrier

Any suitable carrier may be used for implementing a selectively-permeable membrane comprising a polymer matrix, where the polymer matrix comprises polymerized polycarbonate monomers according to the teachings herein.

In some embodiments, it is preferred to use a carrier having one or more of the characteristics described above for the carrier in the description of embodiments of the component. For the sake of brevity, the characteristics of the carrier are nor repeated here.

Plasticizer

In some embodiments, a selectively-permeable membrane comprising a polymer matrix, where the polymer matrix comprises polymerized polycarbonate monomers according to the teachings herein comprises a plasticizer. Any suitable plasticizer may be used for implementing such a selectively-permeable membrane. In some embodiments, it is preferred to use a plasticizer having one or more of the characteristics described above for the plasticizer in the description of embodiments of the component. For the sake of brevity, the characteristics of the plasticizer are nor repeated here.

Hydrophilic Coating

In some embodiments, a selectively-permeable membrane comprising a polymer matrix, where the polymer matrix comprises polymerized polycarbonate monomers according to the teachings herein further comprises a hydrophilic coating on at least one of the two sides. In some embodiments, there is a hydrophilic coating on both sides. In some embodiments, the hydrophilic coating comprises PVP (polyvinylpyrrolidone). In some embodiments, the hydrophilic coating consists of PVP.

Selectively-Permeable Membrane Comprising a Phthalocyanine Carrier.

As noted previously herein, a selectively-permeable membrane requires at least one carrier that preferentially reversibly binds a specified gas. The requirements for a suitable carrier are virtually impossible to meet. The preferential reversible binding must fall within a narrow range that, at relevant temperatures, is sufficiently strong to have a substantial effect yet not too strong to lead to capture of the specified gas in the membrane. The carrier must be functionally associable with a chosen matrix in a manner and in concentrations that allow for the facilitated diffusion of the specified gas to be substantially greater than the simple diffusion of non-specified gases.

As disclosed herein, the Inventors have discovered that it is possible to make an oxygen-selective membrane having a carrier that is a phthalocyanine.

Thus, according to an aspect of some embodiments of the teachings herein, there is provided a non-biological selectively-permeable membrane that is preferably permeable to oxygen, having a first side, a second side and comprising:
 a. a polymer matrix configured to allow passage of gases through the membrane between the first side and the second side by simple diffusion; and
 b. functionally associated with the polymer matrix, at least one carrier that preferentially reversibly binds to oxygen, wherein at least one carrier is a metal complex of a phthalocyanine, and the membrane is an oxygen-selective membranes.

The selectively-permeable membrane which comprises at least one carrier that is a metal complex of a phthalocyanine comprises a polymer matrix configured to allow passage of gases through the membrane between the first side and the second side by simple diffusion. As discussed above, typically the polymer matrix defines pores that provide the fluid communication between the first side and the second side through which gases diffuse. As also known in the art, a selectively-permeable membrane that is selectively-permeable to a oxygen is a membrane for which oxygen has a relatively higher rate of diffusion therethrough than for other gases that is a result of facilitated diffusion of the oxygen through the membrane. In some embodiments, the preferential reversible binding of oxygen to at least one carrier allows passage of oxygen through the membranes at a rate higher than a rate determined by simple diffusion. In some embodiments, the preferentially reversible binding of oxygen to at least one carrier allows passage of oxygen through the membrane between the first side and the second side by facilitated diffusion that includes a step of binding between a molecule of oxygen and the at least one carrier.

Carrier

The metal component of the metal complex of the phthalocyanine is any suitable metal, in some embodiments selected from the group consisting of iron and cobalt.

The phthalocyanine carrier is functionally-associated with the polymer matrix. Any suitable type of functional association may be used for implementing a selectively-permeable membrane comprising at least one carrier that is a phthalocyanine carrier that preferentially reversibly binds to oxygen according to the teachings. In some embodiments, it is preferred that the functional association be as described above in the description of embodiments of the component. For the sake of brevity, the characteristics of the functional association of a selectively-permeable membrane comprising at least one carrier that is a phthalocyanine carrier according to the teachings are not repeated here.

Any suitable amount of the phthalocyanine carrier may be used in implementing the teachings herein. In some such embodiments, the weight ratio of the phthalocyanine carrier to polymer matrix is not less than 25:100 and even not less than 50:100. In some such embodiments, the weight ratio of the phthalocyanine carrier to polymer matrix is not more than 250:100 and even not more than 200:100. In some such embodiments, the weight ratio of the phthalocyanine carrier to polymer matrix is not less than 25:100 and not more than 250:100.

In some embodiments, the membrane further comprises, functionally associated with the polymer matrix, at least one additional carrier different from the phthalocyanine carrier. In some embodiments, the additional carrier also preferentially reversibly binds to oxygen. In some embodiments, the additional carrier preferentially reversibly binds to a gas different than oxygen.

In some embodiments, the at least one additional carrier is also a metal complex of a phthalocyanine, but is different, for example, includes a different metal component or which organic portion has different substituents.

In some embodiments, the at least one additional carrier is not a metal complex of a phthalocyanine.

In some embodiments, the at least one additional carrier is an organic-metal complex that is not a metal complex of a phthalocyanine, in some such embodiments, the at least one additional carrier is selected from the group consisting of a porphyrin and a corrole.

In some embodiments, at least one additional carrier is metal particles, in some such embodiments the metal of the particles selected from the group consisting of cobalt, platinum, palladium, nickel, copper, manganese, ruthenium and iron. In some such embodiments, the metal particles are nanoparticles of metal.

Polymer

Any suitable polymer may be used for implementing a selectively-permeable membrane comprising at least one carrier that is a phthalocyanine carrier according to the teachings. In some embodiments, it is preferred to use a polymer having one or more of the characteristics described above for the polymer matrix in the description of embodiments of the component. For the sake of brevity, the characteristics of the polymer for implementing a selectively-permeable membrane comprising at least one carrier that is a phthalocyanine carrier according to the teachings are repeated here.

Plasticizer

In some embodiments, a selectively-permeable membrane comprising at least one carrier that is a phthalocyanine carrier according to the teachings herein comprises a plasticizer. Any suitable plasticizer may be used for implementing such a selectively-permeable membrane. In some embodiments, it is preferred to use a plasticizer having one or more of the characteristics described above for the plasticizer in the description of embodiments of the component. For the sake of brevity, the characteristics of the plasticizer are nor repeated here.

Hydrophilic Coating

In some embodiments, a selectively-permeable membrane comprising at least one carrier that is a phthalocyanine carrier according to the teachings herein further comprises a hydrophilic coating on at least one of the two sides. In some embodiments, there is a hydrophilic coating on both sides. In some embodiments, the hydrophilic coating comprises PVP (polyvinylpyrrolidone). In some embodiments, the hydrophilic coating consists of PVP.

Device According to the Teachings Herein

The components and membranes as described herein are useful when integrated in a device which performance or function is in some way improved by use of the component or membrane.

Thus, according to an aspect of some embodiments of the teachings herein there is provided a device comprising a component or a membrane according to the teachings herein. In some embodiments, the device is selected from the group consisting of: an electrochemical cell, a metal-air electrochemical cell (e.g., a zinc air electrochemical cell), a fuel cell, an oxygen enrichment unit, an air filter, an indoor air filter, an artificial gill and an artificial lung.

Method According to the Teachings Herein

Components and membranes according to the teachings herein may be used for implementing various different methods. In some embodiments, the components and/or membranes are used for implementing a method according to the teachings herein.

According to an aspect of some embodiments of the teachings herein, there is provided a method of transporting gas molecules from a first fluid volume having a first concentration of a desired gas molecule to a second fluid volume having a second concentration of the desired gas molecule, comprising:

providing a component according to the teachings herein, a component made according to a method of the teachings herein, or a membrane according to the teachings herein; and placing the component or the membrane between the first fluid volume and the second fluid volume, so that the membrane defines a path for fluid communication between the first fluid volume and the second fluid volume thereby allowing gas molecules to diffuse (by simple diffusion or facilitated diffusion) through the component and/or the membrane between the first fluid volume and the second fluid volume.

In some embodiments, the only path for fluid communication between the first fluid volume and the second fluid volume is through a the membrane and/or component.

In some embodiments, the first fluid is a gas. In some embodiments, the first fluid is a liquid.

In some embodiments, the second fluid is a gas. In some embodiments, the second fluid is a liquid.

In some embodiments, the first fluid is a gas at a first pressure and the second fluid is a gas at a second pressure, the first pressure higher than the second pressure.

In some embodiments, the first volume is an oxygen-containing gas and the second volume is a cathode of an electrochemical cell. In some such embodiments, the first volume is ambient air. In some embodiments, the electrochemical cell is selected from the group consisting of a fuel cell and a metal-air cell.

EXPERIMENTAL

Devices

A dip-coating device was made in the laboratory as described in Bormashenko et al. in Macromolecular Chem and Phys 2008, 209(6), 567-576.

Relative humidity was measured using a standard psychrometer (a hygrometer with a wet and dry thermometers.

UV-vis spectroscopy was performed using a Cary® 50 Bio UV-visible spectrophotometer by Varian Medical Systems (Palo Alto, Calif., USA).

Gas chromatography was performed using a YL6100 GC by Young Lin Instrument Co. Ltd. (Anyang, Korea).

The degree of hydrophobicity of surfaces was measured by placing a drop of water on a surface and measuring the contact angle using a Rame-Hart goniometer (model 500), each reported contact angle being the average of 10 separate measurements.

Materials

Except where explicitly noted, all required chemical compounds and reagents were purchased from well-known commercial suppliers, e.g., Sigma-Aldrich (St. Louis, Mo., USA) and BioLab Ltd. (Jerusalem, Israel). The following materials were purchased from the supplied listed in the parentheses:

a. polycarbonate polymer as a matrix
   i. poly (bisphenol A carbonate) average MW 56400, Makrolon® from Covestro Deutschland AG, Leverkusen, Germany (Bayer).
   ii. poly (bisphenol A carbonate) average MW 34100, Cat #435139 from Sigma Aldrich.
   iii. poly (bisphenol A carbonate) average MW 28000, Cat #181641-25G from Fluka.

b. Iron (II) phthalocyanine 95% (Fe(II)PC) (Strem Chemicals Inc., Boston, Mass., USA) as a carrier that preferentially reversibly binds oxygen gas molecules.

c. ethylene carbonate (CAS nr. 96-49-1) as a plasticizer from Sigma-Aldrich.

d. 1-2577 conformal coating solution (DowCorning®, Midland, Mich., USA) as a plasticizer.

e. Meshes of woven strands of stainless steel as support structures from A.D. Sinun Technologies, Petach Tikva, Israel:
   i. open mesh made of 500 micrometer diameter strands as links and nodes defining 500×500 micrometer square holes.
   ii. fine mesh made of 33 micrometer diameter strands as links and nodes defining 33 micrometer square holes.

f. Zinc-air electrochemical cells having a 7 cm×7 cm perforated cover over the air cathode were graciously provided by Electric Fuel Battery Corp (Hanahan, S.C., USA).

Preparation of Sheets of Permeable Membrane

Sheets each constituting a component configured for selective permeation of oxygen therethrough according to the teachings herein were prepared using dip coating of a stainless steel mesh support structure.

A dipping solution of polycarbonate polymer, iron(II) phthalocyanine carrier and optionally a plasticizer in dichloromethane/chloroform (9:1) solvent was made, and 50 ml of the solution placed in a 70 ml beaker.

For each sheet, a 2 cm×2 cm square of stainless steel mesh was washed in ethanol, then acetone in an ultrasonic bath, then air dried. The washed stainless steel mesh square was attached to the dip coating device, immersed in a dipping solution for 6 seconds and then and removed at a constant rate of 42 cm/min making a sheet where spanning the holes of the mesh support structure were membranes of polycarbonate as a matrix and functionally associated Iron (II) phthalocyanine as a carrier. The fresh sheet was allowed to remain suspended from the dip coating device to dry in ambient air having a relative humidity of between 27%-33% and a temperature of 20° C.-25° C.

After drying (typically for an hour), it was seen that the mesh support structure was completely encased in polycarbonate polymer matrix with the functionally associated iron(II) phthalocyanine carrier, with a membrane of the polycarbonate matrix with the iron(II) phthalocyanine carrier spanning the holes of the mesh substantially in the center of the hole (the membrane was at substantially same depth from the first side and the second side of the mesh. The surface of both sides of the membrane spanning the holes of the mesh had an appearance reminiscent of an irregular honeycomb, exhibiting multiple thinner, roughly circular, regions of polymer matrix delineated by a link and node structure of thicker regions of polymer matrix. As previously mentioned, in FIG. 3 is depicted a speculative scanning electron microscopy image of such a surface, where each circular region is in the order of magnitude of 0.1 to 10 micrometer in diameter.

Without wishing to be held to any one theory, it is currently believed that the volatile solvent rapidly evaporated from the freshly dipped sheets, cooling the matrix, leading to condensation of water in the air as small droplets on the surface of the still-soft polymer membranes spanning the holes of the mesh. It is currently believed that the roughly circular depressions in polymer matrix were produced by the water droplets that settled on the surface of the still-soft polycarbonate polymer during drying.

Permeability of Membranes

Four different sheets were prepared as described above from the four different polymer solutions described in Table 1:

TABLE 1

| sheet | polycarbonate MW | polymer weight % in solution | 1-2577 plasticizer (relative to polycarbonate weight in solution) | carrier weight % in polymer solution |
|---|---|---|---|---|
| i | 56400 | 9.1 | 0 | 7.5 |
| ii | 56400 | 11 | 0 | 9.1 |
| iii | 34100 | 15 | 10% | 25 |
| iv | 28000 | 15 | 5% | 25 |

The oxygen permeability of the four sheets each constituting a component configured for selective permeation of oxygen therethrough according to the teachings herein as well as the suitability of such sheets for use as selective gas-diffusion membranes in the field of batteries and fuel cells was evaluated with the help of commercially developed zinc-air cells.

Figure 4:
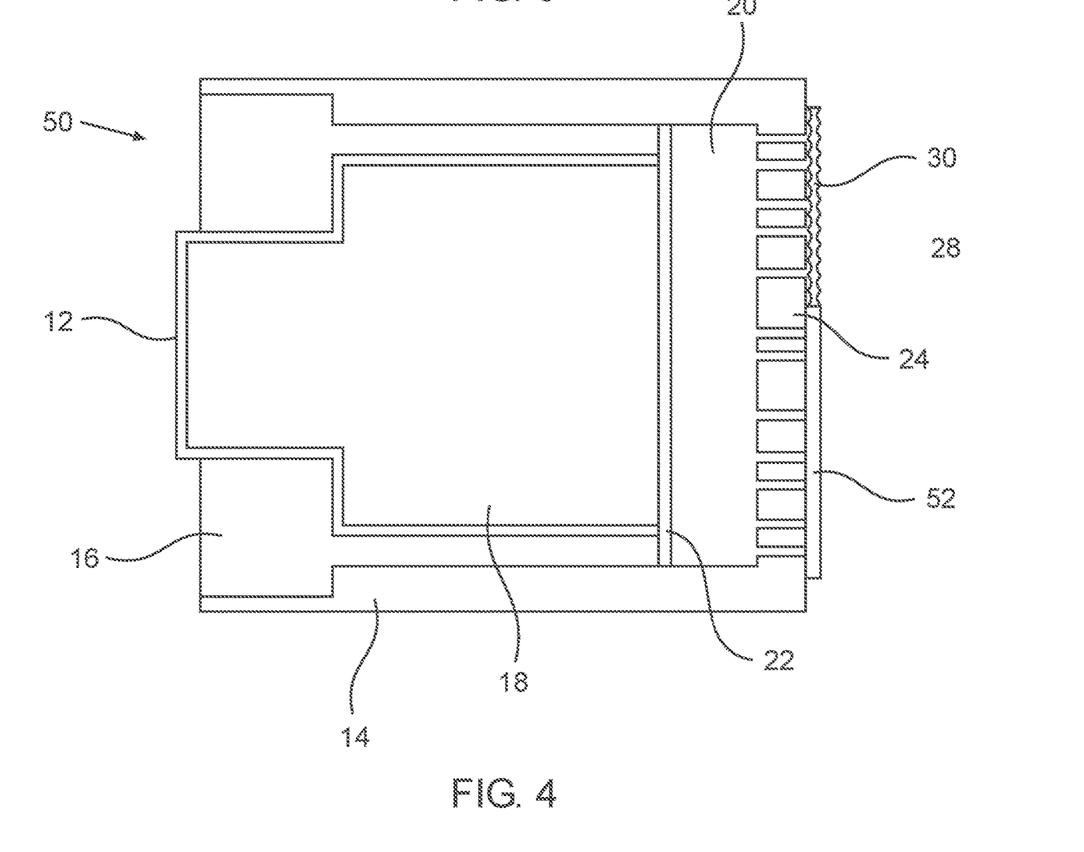
FIG. 4 is a schematic depiction of a metal-air electrochemical cell according to an embodiment of the teachings herein in side cross-section, provided with a component according to the teachings herein as a gas-diffusion membrane.

A zinc-air electrochemical cell 50 according to an embodiment of the teachings herein is schematically depicted in FIG. 4 in side cross section. Cell 50 is substantially identical to metal-air electrochemical cell 10 depicted in FIG. 1 except that perforated cover 24 is partially covered by a component configured for selective permeation of oxygen therethrough according to the teachings herein as a selective gas-diffusion membrane, sheet 30. Portions of perforated cover 24 not covered by sheet 30 are covered by an impermeable metal sheet 52.

For each experiment, one of the four sheets i, ii, iii and iv described in Table 1 were placed in intimate contact over perforated cover 24 so that gas molecules from ambient air could enter air cathode 20 only through the sheet.

While the cell was operated, the DC load of the cell was measured (using a DC programmable 63102 DC electronic load test by Chroma Systems Solutions, Foothill Ranch, Calif., USA) at constant conditions as a measure of oxygen reduction. The potential of the cell was measured through applied current steps of 0.05 A for 120 seconds each step. The current step where the slope of the potential changes is the current where the rate of oxygen flow through the sheet into the cell limits the amount of oxidation, and therefore reflects the oxygen permeability of the membrane of the sheet.

After the limiting current measurements, the rate of loss of water from the cell as a function of time was determined by maintaining the cell at a constant temperature of 37° C. and relative humidity of 17%. The rate of loss of water relative to a control prior art cell without a sheet as a gas-diffusion membrane was calculated using the formula:

$$\text{relative water loss} = 1 - \frac{(\text{rate of water loss from cell with gas diffusion membrane})}{(\text{rate of water loss from cell without gas diffusion membrane})}$$

The results of these experiments are presented in Table 2:

TABLE 2

| sheet | A current limit (mA/cm$^2$ of gas diffusion membrane) | B rate of oxygen flow through gas diffusion membrane (cm$^3$ oxygen/cm$^2$ of gas diffusion membrane/min | C percent reduction of water loss through gas diffusion membrane compared to control | D rate of water loss in cm3 of water vapor/cm2 of gas diffusion membrane/min |
|---|---|---|---|---|
| 1 | 103 ± 13 | 0.399 ± 0.050 | 91 ± 7 | 0.00525 ± 0.00075 |
| 2 | 73 ± 5 | 0.280 ± 0.018 | 88 ± 8 | 0.00345 ± 0.00145 |
| 3 | 30 | 0.118 | 85 | 0.058 |
| 4 | 28 | 0.108 | 89 | 0.043 |

From Table 2 is seen that sheets according to the teachings herein can be used as gas-diffusion membranes, for example, of a metal-air cell by both dramatically reducing the rate of water loss and by allowing oxygen to pass through the sheet from the ambient atmosphere at acceptable rates. Also seen is that the exact composition of the constituent matrix of a membrane has an effect on the maximal rate of oxygen passage through a given membrane.

Exemplary Sheets of Permeable Membrane with Plasticizer

It was hypothesized that the presence of plasticizer in the constituent matrix of a membrane would influence the rate of oxygen passage through the membrane, for example by giving the carrier more mobility in the matrix, thereby changing the mechanism of oxygen passage through the membrane.

Ethylene Carbonate Plasticizer

Four different polymer solutions were prepared by dissolving an amount of 56400 MW polycarbonate as a matrix, an amount of w/w iron(ii) phthalocyanine as a carrier and an amount of ethylene carbonate (EC) as a plasticizer in the dichloromethane/chloroform solvent. Seven different sheets each constituting a component configured for selective permeation of oxygen therethrough according to the teachings herein were prepared by dip-coating either a 33 micrometer stainless steel mesh as a support structure (vi, vii, viii, ix) or a 500 micrometer stainless steel mesh as a support structure (xiv xv and xvi). The water and oxygen permeability of the seven sheets was tested by using the sheets as a gas-diffusion membrane of a zinc-air cell as described above. The exact composition of the polymer solutions as well as the permeability of the associated membrane sheets compare with a similar sheet devoid of plasticizer (v and xiii) appears in Table 3.

TABLE 3

| sheet | polymer weight % in polymer solution | carrier weight % in polymer solution | plasticizer* | E Oxygen permeability | F Rate of oxygen flow | G rate of water loss | H percent reduction of water loss |
|---|---|---|---|---|---|---|---|
| 33 micrometer stainless steel mesh ||||||||
| v | 19 | 10 | none | 0.078 | 0.299 | 0.099 | 76 |
| vi | 19 | 10 | EC 1:15 | 0.059 | 0.225 | 0.023 | 92 |
| vii | 19 | 10 | EC 1:5 | 0.038 | 0.148 | 0.036 | 92 |
| viii | 6.7 | 6.7 | EC 1:3.3 | 0.027 | 0.103 | 0.017 | 96 |
| ix | 12.6 | 6.7 | EC 1:3.3 | 0.058 | 0.225 | 0.042 | 90 |
| 500 micrometer stainless steel mesh ||||||||
| x | 18 | 15 | none | 0.065 | 0.250 | 0.062 | 83 |
| xi | 18 | 15 | DC 1.5% w/w | 0.084 | 0.324 | 0.032 | 67 |
| xii | 18 | 15 | DC 5% w/w | 0.078 | 0.299 | 0.028 | 82 |
| xiii | 19 | 10 | none | 0.065 | 0.250 | 0.061 | 85 |
| xiv | 19 | 10 | EC 1:15 | 0.053 | 0.204 | 0.043 | 90 |
| xv | 19 | 10 | EC 1:5 | 0.059 | 0.225 | 0.044 | 89 |
| xvi | 12.6 | 6.7 | EC 1:3.3 | 0.039 | 0.149 | 0.040 | 90 |

*DC indicates 1-2577 by DowCorning ®; EC indicates ethylene carbonate
E - Oxygen permeability in amperes/cm$^2$
F - rate of oxygen flow through gas diffusion membrane (cm$^3$ oxygen/cm$^2$ of gas diffusion membrane/minute, like column B in Table 2.
G - rate of water loss in cm$^3$ of water vapor/cm$^2$ of gas diffusion membrane/minute, like column D in Table 2
H - percent reduction of water loss through gas diffusion membrane compared to control, like column C in Table 2

Silicone-Based Plasticizer 1-2577 conformal coating solution by DowCorning® is a composition made up of 20-30% toluene, 1-5% methyltrimethoxysilane, 0.1-1% octamethylcyclotetrasiloxane and methanol.

Two different dipping solutions were prepared by dissolving an amount of 56400 MW polycarbonate as a matrix an amount of iron(ii) phthalocyanine as a carrier and an amount (1.5% and 5% w/w for sheets xi and xii, respectively) of 1-2577 conformal coating solution as a plasticizer in the dichloromethane/chloroform solvent. Two different sheets each constituting a component configured for selective permeation of oxygen therethrough according to the teachings herein were prepared by dip-coating a 500 micrometer stainless steel mesh in the two dipping solutions. The water and oxygen permeability of the two sheets was tested by using the sheets as a gas-diffusion membrane of a zinc-air cell as described above. The composition of the polymer solutions as well as the permeability of the associated membrane sheets compare with a similar sheet x devoid of plasticizer appears in Table 3.

From comparing columns E and G for sheets v-vii in Table 3 where the stainless steel mesh has 33 micrometer holes, it is seen that as the amount of ethylene carbonate plasticizer (EC) increases (v<vi<vii), both oxygen and water permeability decreases.

From comparing columns E and G for sheets xiii-xv in Table 3 where the stainless steel mesh has 500 micrometer holes, it is seen that as the amount of ethylene carbonate plasticizer (EC) increases (xiii<xiv<xv), oxygen permeability remains substantially the same but water permeability decreases.

From comparing columns E and G for sheets x-xii in Table 3 where the stainless steel mesh has 500 micrometer holes, it is seen that any amount of silicone plasticizer (DC) substantially increases oxygen permeability and substantially decreases water permeability. Without wishing to be held to any one theory, it is currently believed that the silicone plasticizer facilitates motion of the polymer chains and carrier in the membranes which increases the rate of oxygen passage through such membranes.

Exemplary Sheets of Permeable Membrane with Short-Chain Polycarbonate

The effect on the permeability of a membrane comprising a polymer matrix of relatively short-chain polycarbonate polymer was investigated.

Six different polymer solutions were prepared by dissolving an amount of polycarbonate polymer as a matrix, an amount of iron(ii) phthalocyanine carrier and an amount of 1-2577 conformal coating solution (DC) as a plasticizer in the dichloromethane/chloroform solvent. Six different sheets each constituting a component configured for selective permeation of oxygen therethrough according to the teachings herein were prepared by dip-coating a 500 micrometer stainless steel mesh as described above in each one the six solutions. The water and oxygen permeability of the sheets was tested by using the sheets as a gas-diffusion membrane of a zinc-air cell as described above.

The compositions of the polymer solutions as well as the permeability of the respective sheets compared to a similar sheet devoid of plasticizer appear in Table 4.

that had passed through the membranes of the sheet were determined and compared to the same measurements when the injection port was free and not covered by sheet 1. The results are shown in Table 5:

TABLE 5

| | relative intensity $N_2$ detected | relative intensity $O_2$ detected | relative intensity $CO_2$ detected | $p(N_2)/p(O_2)$ | $p(O_2)/p(CO_2)$ |
|---|---|---|---|---|---|
| inlet open to ambient air | 76.8% | 22.0% | 0.04% (400 ppm) | 3.5 | 550 |
| inlet covered with sheet 1 | 2.84% | 1.06% | 0.000979% (9.79 ppm) | 2.7 | 1083 |

From the results in Table 5 it is seen that sheet 1 constitutes an oxygen-selective membrane. The presence of the sheet reduces N2 flow therethrough by 27×, $CO_2$ flow therethrough by 41× and $O_2$ flow therethrough by only 20×.

TABLE 4

| sheet | polymer weight % in polymer solution | carrier weight % in polymer solution | plasticizer* | E Oxygen permeability | F Rate of oxygen flow | G rate of water loss | H percent reduction of water loss |
|---|---|---|---|---|---|---|---|
| Polycarbonate having average molecular wight of 34100 | | | | | | | |
| xviii | 18 | 15 | none | 0.065 | 0.250 | 0.042 | 70 |
| xix | 18 | 15 | DC 1.5% w/w | 0.065 | 0.250 | 0.031 | 77 |
| xx | 18 | 15 | DC 2.5% w/w | 0.065 | 0.250 | 0.033 | 76 |
| Polycarbonate having average molecular wight of 28000 | | | | | | | |
| xxi | 15 | 15 | none | 0.073 | 0.283 | 0.021 | 84 |
| xxii | 15 | 15 | DC 2.5% w/w | 0.074 | 0.287 | 0.023 | 80 |
| xxiii | 15 | 15 | DC 5% w/w | 0.028 | 0.108 | 0.043 | 89 |

*DC indicates 1-2577 by DowCorning ®
E - Oxygen permeability in amperes/$cm^2$
F - rate of oxygen flow through gas diffusion membrane (cm3 oxygen/$cm^2$ of gas diffusion membrane/minute, like column B in Table 2.
G - rate of water loss in $cm^3$ of water vapor/$cm^2$ of gas diffusion membrane/minute, like column D in Table 2
H - percent reduction of water loss through gas diffusion membrane compared to control, like column C in Table 2

From comparing columns E and G for sheets xviii-xx in Table 4, for polymer matrices having an average polycarbonate molecular weight of 34100, it is seen that as the amount of silicone plasticizer increases (xviii<xix<xx), oxygen permeability remains substantially the same but water permeability decreases.

From comparing columns E and G for sheets xxi-xxiii in Table 4, for polymer matrices having an average polycarbonate molecular weight of 28000, it is seen that addition of a relatively large amount of silicone plasticizer (xxiii), oxygen permeability dramatically decreases while water permeability increases.

Selective Permeability of Membranes

Sheet 1 described above in Table 1 was placed to covering the injection port of a gas-chromatograph. A flow of 100 ml/min air was maintained past the exposed upper side of sheet 1. The gas-chromatograph was activated with a flow of 100 ml/min helium through the gas-chromatograph loop sampler.

The gas-chromatograph was activated and the intensity of peaks corresponding to oxygen, nitrogen and carbon dioxide Surface Treatment The surface of a sheet according to the teachings herein was treated to render the at least one side of the porous medium more hydrophilic. It is currently believed that a sheet functioning as an oxygen-selective gas-diffusion membrane having a more hydrophilic surface contacting an aqueous electrolyte held in the air cathode of a metal-air electrochemical will function as a more effective barrier to water evaporation.

Sheets identical to sheet ii discussed in Table 1 were prepared.

A 1% solution of polyvinylpyrrolidone (PVP) in water was sprayed on one surface of three of the sheets using an airbrush: 1 layer for the first sheet, 2 layers for the second sheet and 4 layers for the third sheet, each layer approximately 1 microgram/cm2 after evaporation of the water.

The contact angle of a droplet of water placed on the PVP-coated surfaces of the sheets was measured to be 78°-96°+9°.

The contact angle of a droplet of water placed on the surfaces of the sheets that were not coated with PVP was measured to be 121°±7°.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A component configured for selective permeation of a specified gas therethrough, the component comprising:
   a. a first side, a second side and a support structure with a plurality of holes passing through said support structure from said first side to said second side;
   b. spanning said holes, selectively-permeable membranes that are selectively permeable to a specified gas, said selectively-permeable membranes comprising:
      i. a first side and a second side;
      ii. a polymer matrix configured to allow passage of gases through said membranes between said first side and said second side of said membranes by simple diffusion; and
      ii. functionally associated with said polymer matrix, at least one carrier that preferentially reversibly binds said specified gas,
   wherein at least one of said first side and said second side of said membranes are patterned with a plurality of depressions so that said selectively-permeable membranes comprise thinner regions of said polymer matrix and thicker regions of said polymer matrix.

2. The component of claim 1, wherein said preferentially reversible binding of said specified gas to at least one said carrier allows passage of said specified gas through said membranes at a rate higher than a rate determined by simple diffusion.

3. The component of claim 1, wherein said preferentially reversible binding of said specified gas to at least one said carrier allows passage of said specified gas through said membranes between said first side and said second side by facilitated diffusion that includes a step of binding between a molecule of specified gas and said at least one carrier.

4. The component of claim 1, wherein said polymer matrix encases said support structure.

5. The component of claim 1, wherein said membranes are not more than 100 micrometers thick.

6. The component of claim 1, wherein said membranes are not less than 1 micrometer thick.

7. The component of claim 1, wherein a majority of said depressions have a surface area of not less than 0.8 micrometer.

8. The component of claim 1, wherein a majority of said depressions have a surface area of not more than 200,000 micrometer$^2$.

9. The component of claim 1, wherein said support structure is not less than 20 micrometers thick.

10. The component of claim 1, wherein said support structure is not more than 2000 micrometers thick.

11. The component of claim 1, wherein said support structure comprises a solid links and node structure that defines said holes.

12. The component of claim 1, wherein said holes of said support structure have a cross-sectional area of not more than 1,000,000 micrometer$^2$.

13. The component of claim 1, wherein said holes have a cross-sectional area of not less than 400 micrometer$^2$.

14. The component of claim 1, wherein said support structure is of a material selected from the group consisting of a metal and a polymer.

15. The component of claim 1, said polymer matrix comprising polymerized monomers selected from the group consisting of polycarbonate monomers, poly(vinylidene dichloride) and polysulfone monomers.

16. The component of claim 1, wherein said specified gas is oxygen so that at least one said carrier of said at least one carrier preferentially reversibly binds oxygen and said membrane is an oxygen-selective membrane.

17. The component of claim 1, at least one said carrier of said at least one carrier being a metal complex of an organic compound selected from the group consisting of a phthalocyanine, a porphyrin and a corrole.

18. The component of claim 1, at least one said carrier of said at least one carrier being metal particles.

19. A method of making a component configured for selective permeation of a specified gas therethrough according to claim 1, the method comprising:
   i. providing a dipping solution including:
      a polymer;
      a carrier that preferentially reversibly binds to a specified gas; and
      a volatile solvent;
   ii. subsequent to i, immersing in said dipping solution a support structure with a plurality of holes passing through said support structure from a first side to a second side of said support structure;
   iii. subsequent to ii, removing said support structure from said dipping solution so that said support structure is coated with said dipping solution; and
   iv. subsequent to iii, maintaining said support in an atmosphere while said support structure is in a position where said first side and said second side are substantially parallel with a gravity vector, thereby allowing said volatile solvent to evaporate into said atmosphere to form selectively-permeable membranes spanning said holes of said support structure, said selectively-permeable membranes patterned with a plurality of depressions so that said selectively-permeable membranes comprise thinner regions of said polymer matrix and thicker regions of said polymer matrix,
thereby making a component configured for selective permeation of a specified gas therethrough.

20. A method of transporting gas molecules from a first fluid volume having a first concentration of a desired gas molecule to a second fluid volume having a second concentration of the desired gas molecule, comprising:
   providing a component of claim 1; and
   placing said component between said first fluid volume and said second fluid volume, so that said membranes of said component define a path for fluid communication between said first fluid volume and said second fluid volume.

\* \* \* \* \*